United States Patent [19]

Hashiguchi et al.

[11] Patent Number: 5,169,905

[45] Date of Patent: Dec. 8, 1992

[54] HYDROGENATION CATALYST COMPOSITION AND PROCESS FOR HYDROGENATING OLEFINICALLY UNSATURATED POLYMER USING THE SAME

[75] Inventors: Yoshiharu Hashiguchi; Hideo Katsumata; Kunio Goshima; Toshio Teramoto; Yasuhiko Takemura, all of Yokkaichi, Japan

[73] Assignee: Japan Synthetic Rubber Co., Ltd., Tokyo, Japan

[21] Appl. No.: 627,770

[22] Filed: Dec. 14, 1990

[30] Foreign Application Priority Data

Dec. 22, 1989 [JP] Japan .................................. 1-331238
Apr. 20, 1990 [JP] Japan .................................. 2-103004

[51] Int. Cl.$^5$ ................................................ C08H 8/04
[52] U.S. Cl. ................................ 525/338; 525/332.8; 525/332.9; 525/333.1; 525/333.2; 525/339
[58] Field of Search ................................ 525/338, 339

[56] References Cited

U.S. PATENT DOCUMENTS

| | | |
|---|---|---|
| 4,213,879 | 7/1980 | Stapp. |
| 4,501,857 | 2/1985 | Kishimoto et al. |
| 4,673,714 | 6/1987 | Kishimoto et al. |
| 4,980,421 | 12/1990 | Teramoto et al. ............... 525/338 |

FOREIGN PATENT DOCUMENTS

| | | |
|---|---|---|
| 0009035 | 3/1980 | European Pat. Off. |
| 339986 | 11/1989 | European Pat. Off. |
| 61-28507 | 2/1986 | Japan. |
| 2134909 | 8/1984 | United Kingdom. |

OTHER PUBLICATIONS

Plasdoc-Central Patents Index-Basic Abstracts Journal, Feb. 20, 1991 London GB Section A, week 9050, A0839, No. 90-373566/50 & JP-A-2272004 (Japan Synthetic Rubber) Jun. 11, 1990 *whole record*.
The Journal of Organic Chemistry, vol. 33, No. 4, Apr. 1968, pp. 1689-1690, Y. Tajima, et al., "Hydrogenation of Conjugated Diolefins with Transition Metal $\pi$ Complexes".
J.A.C.S., vol. 85, Dec. 20, 1963, pp. 4014-4018, M. F. Sloan, et al., "Soluble Catalysts for the Hydrogenation of Olefins[1]".

Primary Examiner—Bernard Lipman
Attorney, Agent, or Firm—Oblon, Spivak, McClelland, Maier & Neustadt

[57] ABSTRACT

A hydrogenation catalyst composition comprising, as essential components, (a) at least one bis(cyclopentadienyl)transition metal compound represented by general formula (i):

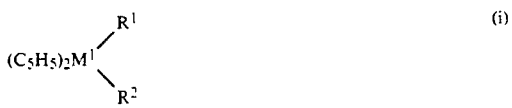

and (b) at least one member selected from the group consisting of complex compounds represented by general formulas (ii) and (iii):

$$M^2(AlR^3R^4R^5R^6) \quad \text{(ii)}$$

$$M^2(MgR^3R^4R^6) \quad \text{(iii)}$$

and further comprising, if necessary, (c) at least one polar compound selected from the group consisting of ether compounds, thioether compounds, ketone compounds, sulfoxide compounds, carboxylic acid ester compounds, lactone compounds, amine compounds, amide compounds, nitrile compounds and oxime compounds and/or (d) an alkali compound represented by general formula (iv):

$$M^2OR^7 \quad \text{(iv)}$$

The contact of an olefinically unsaturated polymer with hydrogen in the presence of said catalyst composition enables the selective hydrogenation of the olefinic double bonds in said polymer. The thus obtained hydrogenated polymer has excellent weather resistance, heat resistance and oxidation resistance.

10 Claims, No Drawings

HYDROGENATION CATALYST COMPOSITION AND PROCESS FOR HYDROGENATING OLEFINICALLY UNSATURATED POLYMER USING THE SAME

This invention relates to a hydrogenation catalyst composition which is stable and which can maintain the hydrogenation activity for a long time after the preparation, as well as to a process for hydrogenating an olefinically unsaturated polymer using the catalyst composition to obtain a hydrogenated polymer having properties such as weather resistance, heat resistance, oxidation resistance and the like.

Polymers having olefinic unsaturations, a representative of which is a conjugated diene polymer, have generally been widely used as elastomers or the like. The olefinic unsaturations in the polymers are advantageously utilized in vulcanization or the like but cause deterioration of weather resistance, heat resistance, etc. of the polymers. Therefore, the fields of application of the polymers have been limited.

The disadvantage that said polymers are inferior in weather resistance, heat resistance and the like can be substantially overcome by hydrogenating the polymers to remove the unsaturations in the polymer chains.

The known methods for hydrogenating a polymer having olefinic unsaturations include (1) a method using a carrier-supported heterogeneous catalyst in which a metal such as nickel, platinum, palladium or the like is supported on a carrier such as carbon, silica, alumina or the like and (2) a method using a homogeneous catalyst obtained by reacting an organometallic compound of nickel, cobalt, titanium or the like with a reducing compound such as organoaluminum, organomagnesium, organolithium or the like in a solvent.

The carrier-supported heterogeneous catalyst used in the method (1) is generally lower in activity than the homogeneous catalyst used in the method (2) and requires severe conditions of high temperature and high pressure in order to actually carry out hydrogenation therewith. Also, with this catalyst, the hydrogenation reaction proceeds when a substance to be hydrogenated is contacted with the catalyst; therefore, when a high polymer is hydrogenated, as compared with when a low molecular weight compound is hydrogenated, the contact of the polymer with the catalyst is difficult owing to the high viscosity of the reaction system, the stereohindrance of the polymer, etc., as a result of which the catalyst is required to be used in a large amount in order to carry out the hydrogenation of the polymer efficiently, and this is uneconomical. Further, the catalyst requires, as mentioned above, a higher temperature and a higher pressure for the hydrogenation reaction, and this tends to cause decomposition of the polymer and gelation of the reaction system and results in an increase in energy cost. Also, when a copolymer of a conjugated diene with an alkenyl-substituted hydrocarbon is hydrogenated with the catalyst in the method (1), even hydrogenation of the aromatic ring portion takes place generally and it is difficult to selectively hydrogenate only the double bonds in the conjugated diene portion.

On the other hand, with the homogeneous catalyst used in the method (2), hydrogenation reaction proceeds usually in a homogeneous system. Therefore, as compared with the carrier-supported heterogeneous catalyst, the homogeneous catalyst is generally high in activity, is used in a small amount, and permits the hydrogenation reaction to proceed at a low temperature and a low pressure.

In addition, when appropriate hydrogenation conditions are selected, the homogeneous catalyst can preferentially hydrogenate the conjugated diene portion of a copolymer of a conjugated diene with an alkenyl-substituted aromatic hydrocarbon.

However, in the case of the homogeneous catalyst, the hydrogenation activity is greatly varied depending upon the reduction state of the catalyst, and therefore, the reproducibility of hydrogenation is inferior and it is difficult to obtain a hydrogenated polymer having a high degree of hydrogenation, with a high reproducibility. Moreover, the catalyst components tend to be converted into inactive substances owing to impurities. Therefore, the impurities in the reaction system deteriorate the hydrogenation activity of the catalyst, and this is also a cause for making poor the reproducibility of hydrogenation with the homogeneous catalyst. The fact that the homogeneous catalyst makes it impossible to obtain a highly hydrogenated polymer with a high reproducibility, is a great obstacle in industrially utilizing the homogeneous catalytic hydrogenation for the improvement of the weather resistance and heat resistance of a polymer.

In the hydrogenation of a polymer with the conventional homogeneous catalyst, the hydrogenation rate cannot be said to be sufficiently high. In addition, the hydrogenation activity is reduced depending upon the reduction state of the catalyst and the impurities in the reaction system, and the reaction rate is reduced as well. Therefore, there has been a problem in hydrogenating a high polymer with the homogeneous catalyst in industry.

Therefore, it is strongly desired that there be developed a highly active hydrogenation catalyst whose activity is hardly affected by impurities in the reaction system and which is capable of producing a highly hydrogenated polymer at a high hydrogenation rate stably regardless of the conditions for preparing the catalyst.

There has been already known hydrogenation with a catalyst comprising a bis(cyclopentadienyl)-titanium compound as one component [see, for example, M. F. Sloan et al., J.A.C.S., 85, 4014–4018 (1965); Y. Tajima et al., J. Org. Chem., 33, 1689-1690 (1968); Japanese Patent Application Kokai No. 59-133203; Japanese Patent Application Kokai No. 61-28507; etc.].

However, the above-mentioned problems have not been solved by these known methods and these publications disclose no technical suggestions for solving the problems.

This invention has been made in the background of the above prior art and aims at providing a hydrogenated catalyst composition which is capable of selectively hydrogenating the olefinic unsaturations in polymer chain at a high hydrogenation rate under mild conditions, which is hardly affected by the impurities in the reaction system and maintains a very high activity for a long time, and which is capable of providing a highly hydrogenated polymer with a high reproducibility.

Another object of this invention is to provide a process for hydrogenating an olefinically unsaturated polymer using the above hydrogenation catalyst composition.

Other objects and advantages of this invention will become apparent from the following description.

According to this invention, there is provided a hydrogenation catalyst composition comprising as essential components:

(a) at least one bis(cyclopentadienyl)-transition metal compound represented by general formula (i):

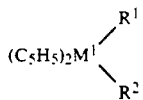

wherein $M^1$ is at least one transition metal atom selected from the group consisting of a titanium atom, a zirconium atom and a hafnium atom; and $R^1$ and $R^2$, which may be the same or different, represent alkyl groups, aryl groups, aralkyl groups, alkoxy groups, aryloxy groups, carboxyl groups, carbonyl groups, δ-diketone ligands or halogen atoms, and (b) at least one member selected from the group consisting of complex compounds represented by general formulas (ii) and (iii):

wherein $M^2$ is at least one alkali metal atom selected from the group consisting of a lithium atom, a sodium atom and a potassium atom; $R^3$ is an alkyl group, an aryl group or an aralkyl group; $R^4$ is an alkyl group, an aryl group, an aralkyl group or a halogen atom; $R^5$ is a halogen atom; and $R^6$ is an alkyl group, an aryl group, an aralkyl group, an alkoxy group or an aryloxy group.

This invention further provides a hydrogenation catalyst composition comprising the above (a) component, the above (b) component and (c) at least one polar compound selected from the group consisting of ether compounds, thioether compounds, ketone compounds, nitrile compounds and oxime compounds.

This invention furthermore provides a hydrogenation catalyst composition comprising the above (a) component, the above (b) component and (d) an alkali compound represented by general formula (iv):

wherein $M^2$ has the same meaning as defined above and $R^7$ is an alkyl group, an aryl group, an aralkyl group or a hydrocarbon group having oxygen atom and/or nitrogen atom, or the above (a) component, the above (b) component, the above (c) component and the above (d) component.

This invention also provides a process for hydrogenating an olefinically unsaturated polymer, which comprises contacting an olefinically unsaturated polymer with hydrogen in the presence of a hydrogenation catalyst composition comprising the above (a) and (b) components, the above (a), (b) and (c) components, the above (a), (b) and (d) components, or the above (a), (b), (c) and (d) components, to selectively hydrogenate the olefinic unsaturations of the polymer.

Specific examples of the bis(cyclopentadienyl)transition metal compound used as the (a) component in this invention are bis(cyclopentadienyl)titaniumdimethyl, bis(cyclopentadienyl)titaniumdiethyl, bis(cyclopentadienyl)titaniumdi-n-butyl, bis(cyclopentadienyl)titaniumdi-sec-butyl, bis(cyclopentadienyl)titaniumdihexyl, bis(cyclopentadienyl)titaniumdioctyl, bis(cyclopentadienyl)titanium dimethoxide, bis(cyclopentadienyl)titanium diethoxide, bis(dicyclopentadienyl)titanium dibutoxide, bis(cyclopentadienyl)titaniumdiphenyl, bis(cyclopentadienyl)titaniuumdi-m-tolyl, bis(cyclopentadienyl)titaniumdi-p-tolyl, bis(cyclopentadienyl)titaniumdi-2,4-xylyl, bis(cyclopentadienyl)titaniumdi-4-ethylphenyl, bis(cyclopentadienyl)titaniumdi-4-hexylphenyl, bis(cyclopentadienyl)titanium diphenoxide, bis(cyclopentadienyl)titanium difluoride, bis(cyclopentadienyl)titanium dichloride, bis(cyclopentadienyl)titanium dibromide, bis(cyclopentadienyl)titanium diiodide, bis(cyclopentadienyl)titaniumdicarbonyl, bis(cyclopentadienyl)methyltitanium chloride, bis(cyclopentadienyl)methoxytitanium chloride, bis(cyclopentadienyl)ethoxytitanium chloride, bis(cyclopentadienyl)phenoxytitanium chloride, bis(cyclopentadienyl)titanium dibenzyl, bis(cyclopentadienyl)titanium diacetate, bis(cyclopentadienyl)titanium diacetylacetate, bis(cyclopentadienyl)zirconiumdimethyl, bis(cyclopentadienyl)zirconiumdiethyl, bis(cyclopentadienyl)zirconiumdi-n-butyl, bis(cyclopentadienyl)zirconiumdi-sec-butyl, bis(cyclopentadienyl)zirconiumdihexyl, bis(cyclopentadienyl)zirconiumdioctyl, bis(cyclopentadienyl)zirconium dimethoxide, bis(cyclopentadienyl)zirconium diethoxide, bis(cyclopentadienyl)zirconium dibutoxide, bis(cyclopentadienyl)zirconium diphenyl, bis(cyclopentadienyl)zirconiumdi-m-tolyl, bis(cyclopentadienyl)zirconiumdi-p-tolyl, bis(cyclopentadienyl)zirconiumdi-2,4-xylyl, bis(cyclopentadienyl)zirconiumdi-4-ethylphenyl, bis(cyclopentadienyl)-zirconium diphenoxide, bis(cyclopentadienyl)zirconium difluoride, bis(cyclopentadienyl)zirconium dichloride, bis(cyclopentadienyl)zirconium dibromide, bis(cyclopentadienyl)zirconium diiodide, bis(cyclopentadienyl)-zirconiumdicarbonyl, bis(cyclopentadienyl)methyl-zirconium chloride, bis(cyclopentadienyl)hafnium-dimethyl, bis(cyclopentadienyl)hafniumdiethyl, bis-(cyclopentadienyl)hafniumdi-n-butyl, bis(cyclopenta-dienyl)hafniumdi-sec-butyl, bis(cyclopentadienyl)hafnium-dihexyl, bis(cyclopentadienyl)hafnium dimethoxide, bis(cyclopentadienyl)hafnium diethoxide, bis(cyclopentadienyl)hafnium dibutoxide, bis(cyclopentadienyl)hafnium-diphenyl, bis(cyclopentadienyl)hafniumdi-m-tolyl, bis(cyclopentadienyl)hafniumdi-p-tolyl, bis(cyclopenta-dienyl)hafniumdi-2,4-xylyl, bis(cyclopentadienyl)hafnium diphenoxide, bis(cyclopentadienyl)hafnium difluoride, bis(cyclopentadienyl)hafnium dichloride, bis(cyclopentadienyl)hafnium dibromide, bis(cyclopentadienyl)hafnium diiodide, bis(cyclopentadienyl)hafniumdicarbonyl and bis(cyclopentadienyl)methylhafnium chloride. These compounds can be used alone or in combination of two or more. Of these bis(cyclopentadienyl)transition metal compounds, those having a high hydrogenation activity to olefinic unsaturations in polymer chain and enabling the selective hydrogenation of said unsaturations at a high conversion under mild conditions are bis(cyclopentadienyl)titaniumdimethyl, bis(cyclopentadienyl)-titaniumdi-n-butyl, bis(cyclopentadienyl)titanium dichloride, bis(cyclopentadienyl)titaniumdiphenyl, bis(cyclopentadienyl)titaniumdi-p-tolyl, bis(cyclopentadienyl)titanium dicarbonyl, bis(cyclopentadienyl)-titanium dibenzyl, bis(cyclopentadienyl)zirconium dichloride, bis(cyclopentadienyl)zirconium dibromide, bis(cyclopentnadienyl)zirconium diphenyl, bis(cyclopentadienyl)zirconiumdi-p-tolyl, bis(cyclopentadienyl)-hafnium dichloride, bis(cyclopentadienyl)hafnium dibromide, bis(cyclopentadienyl)hafnium diphenyl and bis(cyclopentadienyl)hafniumdi-p-tolyl.

Next, of the complex compounds as the (b) component, the complex compound represented by formula (ii) can be synthesized by reacting an organic alkali compound with an organoaluminum compound, and the complex compound represented by formula (iii) can be synthesized by reacting an organic alkali compound with an organomagnesium compound.

The organic alkali compound includes ethyllithium, propyllithium, n-butyllithium, sec-butyllithium, t-butyllithium, hexyllithium, 1,4-dilithiobutane, a reaction product of butyllithium with divinylbenzene, alkylenedilithiums, phenyllithium, stilbendilithium, isopropenylbenzenedilithium, lithium naphthalide, trimethylsilyllithium, (t-butyldimethylsilyl)lithium, methoxylithium, ethoxylithium, n-propoxylithium, isopropoxylithium, n-butoxylithium, secbutoxylithium, t-butoxylithium, pentyloxylithium, hexyloxylithium, heptyloxylithium, octyloxylithium, phenoxylithium, 4-methylphenoxylithium, 2,6-di-t-butyl-4-methylphenoxylithium, benzyloxylithium, t-butylsodium, phenylsodium, sodium naphthalide, trimethylsilylsodium, methoxysodium, ethoxysodium, t-butylpotassium, potassium naphthalide, methoxypotassium, etc.

The organic alkali compound is particularly preferably n-butyllithium, sec-butyllithium and t-butyllithium in view of its combination with the organoaluminum compound or the organomagnesium compound.

Specific examples of the organoaluminum compound are dimethylaluminum chloride, methylaluminum dichloride, diethylaluminum chloride, ethylaluminum dichloride, methylaluminum sesquichloirde, ethylaluminum sesquichloride, isobutylaluminum dichloride, phenylaluminum dichloride, (2-ethylhexyl)aluminum dichloride, etc. Of these, diethylaluminum chloride and ethylaluminum dichloride are preferable in view of their commercial availability and easy handling, etc.

Specific examples of the organomagnesium compound are dimethylmagnesium, diethylmagnesium, methylmagnesium bromide, methylmagnesium chloride, ethylmagnesium bromide, ethylmagnesium chloride, phenylmagnesium bromide, phenylmagnesium chloride, dimethylmagnesium, t-butylmagnesium chloride, etc. Of these, preferable are ethylmagnesium bromide and ethylmagnesium chloride.

The complex compound, which is the (b) component, can be synthesized by reacting the organic alkali compound [referred to hereinafter as "(b-1) component", in some cases] with the organoaluminum compound or organomagnesium compound [referred to hereinafter as "(b-2) component", in some cases] at a (b-1) component/(b-2) component molar ratio of 1/0.5 to 1/2.0, preferably 1/1, in an organic solvent such as cyclohexane, toluene or the like.

The reaction can be effected at a temperature of −80° to 120° C., preferably −20° to 100° C., preferably in an inert atmosphere such as nitrogen gas.

The polar compound, which is the (c) component, is at least one compound selected from the group consisting of ether compounds, thioether compounds, ketone compounds, sulfoxide compounds, carboxylic acid ester compounds, lactone compounds, amine compounds, amide compounds, nitrile compounds and oxime compounds.

Specific examples of the ether compounds are dimethyl ether, diethyl ether, di-n-propyl ether, diisopropyl ether, di-n-butyl ether, di-sec-butyl ether, di-t-butyl ether, diphenyl ether, methyl ethyl ether, ethyl butyl ether, butyl vinyl ether, anisole, ethyl phenyl ether, ethylene glycol dimethyl ether, ethylene glycol diethyl ether, ethylene glycol dibutyl ether, diethylene glycol dimethyl ether, diethylene glycol diethyl ether, furan, tetrahydrofuran, α-methoxy-tetrahydrofuran, pyran, tetrahydropyran, dioxane, etc.

Specific examples of the thioether compounds are dimethyl sulfide, diethyl sulfide, di-n-propyl sulfide, di-n-butyl sulfide, di-sec-butyl sulfide, di-t-butyl sulfide, diphenyl sulfide, methyl ethyl sulfide, ethyl butyl sulfide, thioanisole, ethyl phenyl sulfide, thiophene, tetrahydrothiophene, etc.

Specific examples of the ketone compounds are acetone, diethyl ketone, di-n-propyl ketone, diisopropyl ketone, di-n-butyl ketone, di-sec-butylketone, di-t-butyl ketone, benzophenone, methyl ethyl ketone, acetophenone, benzyl phenyl ketone, propiophenone, cyclopentanone, cyclohexanone, diacetyl, acetylacetone, benzoylacetone, etc.

Specific examples of the sulfoxide compounds are dimethyl sulfoxide, tetramethylene sulfoxide, pentamethylene sulfoxide, diphenyl sulfoxide, dibenzyl sulfoxide, p-tolyl sulfoxide, etc.

Specific examples of the carboxylic acid esters are esters of a monobasic acid (e.g. acetic acid, propionic acid, butyric acid, caproic acid, lauric acid, palmitic acid, stearic acid, cyclohexylpropionic acid, cyclohexylcaproic acid, benzoic acid, phenylbutyric acid, o-toluic acid, m-toluic acid, p-toluic acid or the like) or a dibasic acid (e.g. oxalic acid, maleic acid, malonic acid, fumaric acid, succinic acid, adipic acid, pimelic acid, suberic acid, sebacic acid, itaconic acid, phthalic acid, isophthalic acid, terephthalic acid, naphthalic acid, diphenic acid or the like) with an alcohol (e.g. methyl alcohol, ethyl alcohol, n-propyl alcohol, isopropyl alcohol, n-butyl alcohol, sec-butyl alcohol, t-butyl alcohol, amyl alcohol, hexyl alcohol, octyl alcohol, phenol, cresol or the like), and β-ketoesters such as methyl acetoacetate, ethyl acetoacetate and the like.

Specific examples of the lactone compounds are β-propiolactone, δ-valerolactone, e-caprolactone, and lactone compounds corresponding to the following acids: 2-methyl-3-hydroxy-propionic acid, 3-hydroxynonanoic acid (i.e. 3-hydroxypelargonic acid), 2-dodecyl 3-hydroxypropionic acid, 2-cyclopentyl-3-hydroxypropionic acid, 3-phenyl-3-hydroxypropionic acid, 2-naphthyl-3-hydroxypropionic acid, 2-n-butyl-3-cyclohexyl-3-hydroxypropionic acid, 2-phenyl-3-hydroxytridecanoic acid, 2-(2-methylcyclopentyl)-3-hydroxypropionic acid, -methylphenyl-3-hydroxypropionic acid, 3-benzyl-3-hydroxypropionic acid, 2,2-dimethyl-3-hydroxypropionic acid, 2-methyl-5-hydroxyvaleric acid, 3-cyclohexyl-5-hydroxyvaleric acid, 4-phenyl-5-hydroxyvaleric acid, 2-heptyl-4-cyclopentyl-5-hydroxyvaleric acid, 2-methyl-3-phenyl-5-hydroxyvaleric acid, 3-(2-cyclohexylethyl)-5-hydroxyvaleric acid, 2-(2-phenylethyl)-4-(4-cyclohexylbenzyl)-5-hydroxyvaleric acid, benzyl-5-hydroxyvaleric acid, 3-ethyl-5-isopropyl-6-hydroxycaproic acid, -cyclopentyl-4-hexyl-6-hydroxycaproic acid, 3-phenyl-6-hydroxycaproic acid, 3-(3,5-diethylcyclohexyl)-5-ethyl-hydroxycaproic acid, 4-(3-phenylpropyl)-6-hydroxycaproic acid, 2-benzyl-5-isobutyl-6-hydroxycaproic acid, -phenyl-6-hydroxyoctanoic acid, 2,2-di(1-cyclohexenyl)-hydroxyheptanoic acid, 2,2-dipropenyl-5-hydroxy-heptanoic acid, 2,2-dimethyl-4-propenyl-3-hydroxyheptanoic acid, etc.

Specific examples of the amine compounds are isopropylamine, n-butylamine, sec-butylamine, t-butylamine, n-amylamine, t-amylamine, n-hexylamine, n-heptylamine, aniline, benzylamine, o-anisidine, m-anisidine, p-anisidine, α-naphthylamine, dimethylamine, diethylamine, di-n-propylamine, diisopropylamine, di-n-butylamine, di-sec-butylamine, di-t-butylamine, di-n-amylamine, diisoamylamine, dibenzylamine, N-methylaniline, N-ethylbenzylamine, N ethylaniline, N-ethyl-o-toluidine, N-ethyl m toluidine, N-ethyl-p-toluidine, triethylamine, tri-n-propylamine, tri-n-butylamine, tri-n-amylamine, triphenylmethylamine, tri-n-hexylamine, tri-benzylamine, triphenylamine, N,N-dimethylbenzylamine, N,N-dimethylaniline, N,N-diethylaniline, N,N-diethyl-o-toluidine, N,N-diethyl-m-toluidine, N,N-diethyl-p-toluidine, N,N-dimethyl-α-naphthylamine, N,N,N',N'-tetramethylethylenediamine, pyrrolidine, piperidine, N-methylpyrrolidine, N-methylpiperidine, pyridine, piperazine, 2-acetylpyridine, N-benzylpiperazine, quinoline, morpholine, etc.

The amide compounds are compounds having at least one

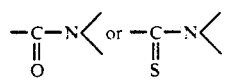

bond in the molecule, and include specifically N,N-dimethylformamide, N,N-dimethylacetamide, N-methylpyrrolidone, acetamide, propionamide, benzamide, acetanilide, benzanilide, N-methylacetanilide, N,N-dimethylthioformamide, N,N-dimethyl-N',N'-(p-dimethylamino)benzamide, N-ethylene-N-methyl-8-quinolinecarboxamide, N,N'-dimethylnicotin-amide, N,N-dimethylmethacrylamide, N-methylphthalimide, N-phenylphthalimide, N-acetyl-ε-caprolactam, N-methyl-ε-caprolactam, N,N,N',N'-tetramethylphthalamide, 10-acetylphenoxazine, 3,7-bis(diethylamino)-10-benzoylphenothiazine, 10-acetylphenothiazine, 3,7-bis(dimethyl-amino)-10-benzoylphenothiazine, N-ethyl-N-methyl-8-quinolinecarboxamide, etc. The amide compounds further
include straight chain urea compounds such as N,N'-dimethylurea, N,N'-diethylurea, N,N'-dimethylethylene-urea, N,N,N',N'-tetramethylurea, N,N,N',N'-tetraethylurea, urea, N,N-dimethyl-N',N'-diethylurea, N,N-dimethyl-N',N'-diphenylurea and the like.

Specific examples of the nitrile compounds are acetonitrile, propionitrile, benzonitrile, benzyl-nitrile, adiponitrile, malononitrile, N,N-dimethyl-aminobenzylnitrile, etc.

Specific examples of the oxime compounds are acetoxime, methyl ethyl ketone oxime, diethyl ketone oxime, acetophenone oxime, benzophenone oxime, benzyl phenyl ketone oxime, cyclopentanone oxime, cyclohexanone oxime, benzaldehyde oxime, etc.

Of these polar compounds, preferable are diethyl ether, ethylene glycol dimethyl ether, ethylene glycol diethyl ether, tetrahydrofuran, dioxane, thioanisole, acetone, dimethyl sulfoxide, benzoic acid esters, p-toluic acid esters, β-propiolactone, triethylamine, N,N,N',N'-tetramethylethylenediamine, N,N-dimethylformamide, acetonitrile, benzonitrile, acetoxime and benzophenone oxime.

Specific examples of the alkali compound represented by general formula (iv), which is the (d) component, are methoxylithium, ethoxylithium, n-propoxylithium, isopropoxylithium, n-butoxylithium, secbutoxylithium, t-butoxylithium, pentyloxylithium, hexyloxylithium, heptyloxylithium, octyloxylithium, phenoxylithium, 4-methylphenoxylithium, 2,6-di-t-butyl-4-methylphenoxylithium, benzyloxylithium, (2-butoxyethoxy)lithium, {2-(N,N-dimethylamino)ethoxy}-lithium, methoxysodium, ethoxysodium, methoxypotassium, reaction products of an alkyllithium compound with an alcoholic or phenolic hydroxyl group-containing compound, etc.

The molar ratio of the (a) component/the (b) component in the catalyst composition used in this invention is preferably 0.5 to 20.0, more preferably 1.0 to 15.0, most peferably 3.0 to 10.0. When the molar ratio is less than 0.5, the catalyst composition gives a very low hydrogenation rate. When the molar ratio is more than 20.0, the catalyst composition has an insufficient hydrogenation activity.

The molar ratio of the (c) component/the (a) component is preferably 3.0 or more, more preferably 5.0 to 50.0. When the molar ratio is less than 3.0, the catalyst activity is reduced in a short period of time, and such a ratio is not desirable for practical use.

The molar ratio of the (d) component/the (a) component is preferably 10.0 or less. Even when the molar ratio is more than 10.0, the catalyst composition still retains a catalyst activity for hydrogenation; however, in this case, it follows that the (d) component which does not substantially contribute to said activity is used in a large amount, which is not only uneconomical but also invites gelation of polymer and side reactions.

The catalyst composition of this invention is used in an amount of preferably 0.005 to 50.0 mM in terms of the (a) component, per 100 g of the polymer to be hydrogenated. When the amount is less than 0.005 mM, the hydrogenation efficiency of the catalyst composition is inferior. When the amount is more than 50 mM, hydrogenation is possible, but the use of the catalyst in an amount larger than the necessary amount is uneconomical and the removal of the catalyst residue from the polymer becomes complicated.

The catalyst composition of this invention can be prepared by, for example, mixing solutions in an inert organic solvent of the (a) and (b) components, those of the (a), (b) and (c) components, those of the (a), (b) and (d) components or those of the (a), (b), (c) and (d) components.

In this case, the order of addition of each component is not critical.

The olefinically unsaturated polymer which can be hydrogenated according to this invention, includes all polymers having olefinic carbon-to-carbon double bonds in the main chain or side chains. Preferable representative examples are conjugated diene polymers and random, block or graft copolymers of a conjugated diene with a monomer copolymerizable therewith.

The conjugated diene polymers include, for example, conjugated diene homopolymers, copolymers obtained by copolymerizing conjugated dienes with one another, and copolymers obtained by copolymerizing at least one conjugated diene with at least one monomer copolymerizable therewith.

The conjugated diene used in the production of the conjugated diene polymer includes conjugated dienes generally having 4–12 carbon atoms. Specific examples are 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, chloroprene, etc.

1,3-Butadiene and isoprene are particularly preferable in order to obtain an elastomer having excellent properties which can advantageously be used in industry. Elastomers such as polybutadiene polyisoprene and butadiene/isoprene copolymer are particularly preferable in carrying out this invention. In these polymers, the microstructure is not critical; therefore, a polymer of any microstructure can be preferably used for hydrogenation. However, a polymer of a low vinyl content has a lowered solubility after hydrogenation and, for uniform hydrogenation, only limited solvents may be used. Accordingly, a polymer having a vinyl content of about 10% or more is more preferable for hydrogenation.

Meanwhile, the hydrogenation process of this invention can be used particularly preferably for a copolymer obtained by copolymerizing at least one conjugated diene with at least one monomer copolymerizable therewith.

The preferable conjugated diene used in the production of such a copolymer may be the above-mentioned ones. The monomer copolymerizable with the conjugated diene may be any monomer copolymerizable with the conjugated diene, but an alkenyl-substituted aromatic hydrocarbon is particularly preferable.

In order to obtain commercially useful and highly valuable elastomers and thermoplastic elastomers, copolymers of a conjugated diene and an alkenyl-substituted aromatic hydrocarbon are particularly important. The alkenyl-substituted aromatic hydrocarbon used in the production of such a copolymer includes specifically styrene, t-butylstyrene, o-methylstyrene, p-methylstyrene, divinylbenzene, 1,1-diphenylethylene, N,N-dimethyl-p-aminoethylstyrene, N,N-diethyl-p-aminoethylstyrene, vinylpyridine, etc. Particularly preferred are styrene and α-methylstyrene. Specific examples of the copolymer include butadiene/styrene copolymer, isoprene/styrene copolymer, butadiene/α-methylstyrene copolymer, etc., which are most preferable because they can give hydrogenated copolymers of high commercial value.

Such a copolymer includes random copolymers in which the monomers are statistically distributed throughout the polymer, tapered block copolymers, complete block copolymers and graft copolymers.

In order to obtain commercially useful thermoplastic elastomers, the copolymer comprises preferably 5 to 95% by weight of an alkenyl-substituted aromatic hydrocarbon.

The vinyl content is preferably at least 10% by weight based on the total weight of the conjugated diene units, because it gives a hydrogenated polymer of excellent properties.

The polymer used in the hydrogenation in this invention includes block copolymers of straight chain type, and block polymers of so-called branched chain type, radial type and star type, obtained by coupling a polymer with a coupling agent, all having a molecular weight of generally about 1,000 to 1,000,000.

The coupling agent includes specifically diethyl adipate, divinylbenzene, tetrachlorosilane, methyldichlorosilane, butyltrichlorosilane, (dichloromethyl)trichlorosilane, (dichlorophenyl)trichlorosilane, 1,2-bis(-trichlorosilyl)ethane, hexachlorodisilane, 1,2,3,4,7,7-hexachloro-6-methyldichlorosilyl-2-norbornene, octachlorotrisiloxane, trichloromethyltri-chlorosilane, tetrachlorotin, butyltrichlorotin, tetrachlorogermanium, 1,2-dibromoethane, epoxidized linseed oil, tolylene diisocyanate, etc.

Polymers terminally modified with a polar group by living anionic polymerization and polymers modified with a polar group by other means are also included. The polar group used for the modification includes hydroxyl group, carboxyl group, ester group, isocyanate group, urethane group, amido group, urea group, thiourethane group, etc.

There can also be used other polymers produced by any of other known polymerization methods such as anionic polymerization method, cationic polymerization method, coordination polymerization method, radical polymerization method, solution polymerization method and emulsion polymerization method.

Moreover, polymers of cyclic olefin monomers obtained by ring-opening polymerization with a metathesis catalyst of Mo, W, etc. are also included in the polymer having olefinic unsaturations used in this invention.

Such cyclic olefin monomers include specifically cycloalkenes such as cyclobutene, cyclopentene, cyclooctene, 1,5-cyclooctadiene, 1,5,9-cyclododecatriene, norbornene, 5-methylnorbornene and the like; and norbornene derivatives such as methyl 5-norbornene-2-carboxylate, ethyl 5-norbornene-2-carboxylate, phenyl 5-norbornene-2-carboxylate, methyl norbornene-2-carboxylate, dimethyl 5-norbornene-2,3-dicarboxylate, cyclohexyl 5-norbornene-2-carboxylate, allyl 5-norbornene-2-carboxylate, 5-norbornene-2-yl acetate, 5-norbornene-2-nitrile, 3-methyl-5-norbornene-2-nitrile, 2,3-dimethyl-5-norbornene-2,3-dinitrile, 5-norbornene-2-carboxylic acid amide, N-methyl-5-norbornene-2-carboxylic acid amide, N,N-diethyl-5-norbornene-2-carboxylic acid amide, N,N-dimethyl-2-methyl-5-norbornene-2,3-dicarboxylic acid diamide, 5-norbornene-2,3-dicarboxylic acid anhydride (Himic anhydride), 2,3-dimethyl-5-norbornene-2,3-dicarboxylic acid imide, N-phenyl-2-methyl-5-norbornene-2,3-dicarboxylic acid imide, 5-methyl-5-carboxycyclo-hexylbicyclo[2,2,1]-2-heptene, 5-methyl-5-carboxy(4-t-butylcyclohexyl)bicyclo[2,2,1]-2-heptene, 8-methyl-8-carboxycyclohexyltracyclo[4,4,0,1$^{2.5}$1$^{7.10}$]-3-dodecene, 5-methyl-5-carboxytricyclo[5,2,1,0$^{2.6}$]decyl-8'-bicyclo-[2,2,1]-2-heptene and the like.

All of the catalyst composition comprising the (a) component [bis(cyclopentadienyl)transition metal compound] and the (b) component (complex compound), the catalyst composition comprising the (a) component, the (b) component and the (c) component (polar compound), the catalyst composition comprising the (a) component, the (b) component and the (d) component (alkali compound) and the catalyst composition comprising the (a) component, the (b) component, the (c) component and the (d) component, can maintain a high hydrogenation activity for a long time with a high reproducibility. In the case that these components are premixed, it is desirable to effect the premixing in an inert atmosphere.

The inert atmosphere referred to above means an atmosphere not reacting with any substances used in the hydrogenation reaction, such as nitrogen, helium, neon, argon or the like. Air or oxygen is not desirable because they oxidize the catalyst and cause deactivation of the catalyst.

The premixing of the catalyst components can also be made in a hydrogen atmosphere.

The hydrogenation reaction of this invention is effected in a state in which an olefinically unsaturated polymer is dissolved in a hydrocarbon solvent. It can also be effected by producing an olefinically unsaturated polymer by polymerization in a hydrocarbon solvent and successively carrying out the hydrogenation of the polymer.

As the hydrocarbon solvent, there can be used aliphatic hydrocarbons such as pentane, hexane, heptane, octane and the like; alicyclic hydrocarbons such as cyclopentane, methylcyclopentane, cyclohexane and the like; and aromatic hydrocarbons such as benzene, toluene, xylene, ethylbenzene and the like. These hydrocarbons may contain an ether such as diethyl ether, tetrahydrofuran, dibutyl ether or the like, in an amount of 20% by weight or less.

In carrying out the hydrogenation reaction of this invention, the polymer concentration is not critical but is ordinarily 1-30% by weight, preferably 3-20% by weight.

The hydrogenation reaction is effected by adding the hydrogenation catalyst composition of this invention to a polymer solution in an inert gas (e.g. nitrogen, argon or the like) or hydrogen atmosphere, feeding hydrogen thereto at a pressure of 1-100 kg/cm$^2$G, and maintaining the reaction system at a predetermined temperature with or without stirring.

The hydrogen pressure used in the hydrogenation reaction is preferably 1-100 kg/cm$^2$G. When it is less then 1 kg/cm$^2$G, the hydrogenation rate is low and it is difficult to obtain a high degree of hydrogenation, and when the hydrogen pressure is more than 100 kg/cm$^2$G, the hydrogenation reaction is substantially completed just after the application of the hydrogen pressure and unnecessary side reactions and gelation are caused. The hydrogen pressure for hydrogenation is more preferably 4-20 kg/cm$^2$G, and the optimum hydrogen pressure is selected considering the amount of the catalyst added and other conditions. When the catalyst amount is smaller, it is preferable to apply a higher hydrogen pressure in the above-mentioned range.

The hydrogenation temperature is preferably in the range of 0-150° C. When the temperature is lower than 0° C., the catalyst activity is low, the hydrogenation rate is also low, and accordingly the catalyst is required to be in a large amount; therefore, the hydrogenation reaction at such a temperature is uneconomical. Meanwhile, when the temperature is higher than 150° C., decomposition and gelation of the polymer tend to occur, and further hydrogenation of the aromatic nuclei tends to occur. This lowers the selectivity of hydrogenation. The hydrogenation temperature is more preferably in a range of 20-120° C.

The hydrogenation time in this invention is 1 minute to 10 hours. The hydrogenation time is shorter when the amount of the hydrogenation catalyst used is larger and when the hydrogen pressure used is higher.

The hydrogenation reaction in this invention may be carried out in a batchwise manner or in a continuous manner.

An olefinically unsaturated polymer can be hydrogenated by the hydrogenation reaction of this invention to such an extent that at least 80%, preferably at least 90%, of the olefinic unsaturations of the polymer are hydrogenated. In this case, however, substantially no hydrogenation (5% or less) of the double bonds of aromatic nuclei takes place even if the polymer contains such double bonds. In the hydrogention reaction of this invention, substantially no scission of polymer molecule is caused.

According to the hydrogenation process of this invention, it is possible to hydrogenate the double bonds in a polymer to any desired.

The hydrogenation catalyst composition of this invention can also be used for the hydrogenation of alkenyl aromatic compounds such as styrene and the like.

The hydrogenated polymer obtained according to the process of this invention can be isolated from the polymer solution by various methods, for example, (a) a method comprising removing, if necessary, the catalyst residue from the polymer solution, adding an antioxidant to the resulting polymer solution, pouring the resulting mixture into a hot water together with steam, and effecting steam distillation to recover the solvent and simultaneously recover a polymer in a crumb form, (b) a method comprising casting the polymer solution on a heated roll to evaporate the solvent and recover a polymer, and (c) a method comprising pouring the polymer solution into a polar solvent (e.g. alcohol, acetone or the like) to precipitate a polymer and recovering the same.

In the hydrogenation process of this invention, the amount of the catalyst used is small; as a result, the amount of the catalyst remaining in the hydrogenated polymer is small and hardly affects the weather resistance and heat resistance of the polymer; accordingly, the step of the catalyst removal can be eliminated.

The present invention can produce a highly hydrogenated polymer at a high rate with a high reproducibility, by using a catalyst system comprising a bis(cyclopentadienyl)transition metal compound, a specific complex compound and, if necessary, a polar compound, which catalyst system has overcome the drawbacks of the conventional homogeneous hydrogenation catalyst, is hardly affected by the impurities in the reaction system, and can maintain a high hydrogenation activity for a long time.

This invention is explained below more specifically referring to Examples. However, this invention is not restricted to them.

In the Examples, the vinyl content in the conjugated diene polymer used was determined from the infrared absorption spectrum according to the Hampton method [R.R. Hampton, Anal. Chem., 29, p. 923 (1949)].

EXAMPLES 1-3

Catalyst (a) Component

A commercially available bis(cyclopentadienyl)-titanium dichloride was used as the (a) component, i.e. the bis(cyclopentadienyl)transition metal compound.

Preparation of Catalyst (b) Component

Into a 300 ml eggplant shape flask containing a magnetic stirrer were charged 100 ml of cyclohexane and 10 ml of a toluene solution containing 1.0 M/liter of diethylaluminum chloride, in a dry nitrogen atmosphere.

To the resulting mixture being stirred was dropwise added 6.25 ml of a n-hexane solution containing 1.6 M/liter of n-butyllithium while the flask was cooled in an ice bath. The resulting mixture was heated to room temperature with stirring, and the stirring was continued at room temperature for 30 minutes. The resulting white powder was washed with cyclohexane and then vacuum-dried.

In the resulting powder, the ratio of lithium atom to aluminum atom was approximately 1 : 1.

Preparation of Catalyst (d) component

Into the same apparatus as used above were charged 10 ml of cyclohexane and 6.25 ml of a n-hexane solution containing 6 M/liter of n-butyllithium. To the mixture being stirred was dropwise added 20 ml of a cyclohexane solution containing 0.5 M/liter of 2,6-di-t-butyl-4-methylphenol while the apparatus was cooled in an ice bath. The resulting mixture was heated to room temperature with stirring, and the stirring was continued at room temperature for 30 minutes.

Then, concentration adjustment was made to prepare a solution containing 0.2 M/liter of 2,6-di-t-butyl-4-methylphenoxylithium.

Preparation of Polymer Solution

Each of the polymers shown below was dissolved in purified and dried cyclohexane to prepare three polymer solutions each containing 20% by weight of a polymer.

A: JSR SL 552 (a styrene-butadiene branched chain random polymer manufactured by Japan Synthetic Rubber Co., Ltd.; bound styrene content =24%; 1,2-vinyl content in butadiene portion =39%).

B: JSR SL 574 (a styrene-butadiene branched chain random polymer manufactured by Japan Synthetic Rubber Co., Ltd.; bound styrene content=15%; 1,2-vinyl content in butadiene portion=57%).

C: Kraton D-1101 (a styrene-butadiene-styrene block polymer manufactured by Shell).

Hydrogenation of Polymer 5 kg of each of the above polymer solutions was charged into a dried 10-liter autoclave and maintained at 70° C. with stirring.

Separately, into a 100-ml pressure glass bottle purged with nitrogen were charged 1.0 mM of the above catalyst (a) component, 6.0 mM of the above (b) component, 20 ml of cyclohexane and 3.0 mM of the above (d) component; and the resulting mixture was aged at 50° C. for 10 minutes.

Then, the whole portion of the mixture was added to the polymer solution in the autoclave.

Dried hydrogen gas was fed to the autoclave at a pressure of 5 kg/cm²G, and reaction was effected with stirring. When the degree of hydrogenation reached 40'50%, the reaction temperature was lowered to 40° C. and the reaction was continued for a further 1 hour.

The autoclave was returned to room temperature and atmospheric pressure into water with stirring. Then, the solvent was removed by steam distillation to obtain a white hydrogenated polymer. The hydrogenated polymer was measured for degree of hydrogenation by infrared absorption spectrum. The results obtained are shown in Table 1.

TABLE 1

|  | Kind of polymer | Hydrogenation degree (%)*¹ |
|---|---|---|
| Example 1 | A | 99 |
| Example 2 | B | 99 |
| Example 3 | C | 100 |

Note
*¹The degree of hydrogenation of olefinic double bonds (the same applies hereinafter).

EXAMPLES 4-9

Catalyst (a) Component

Each of the bis(cyclopentadienyl)transition metal compounds shown in Table 2 was used as the catalyst (a) component.

Preparation of Catalyst (b) Component

Catalyst (b) components were prepared by repeating the same procedure as for the (b) component of Example 1, except that the n-butyllithium used in Example 1 was replaced by one of the organic alkali compounds shown in Table 2 and the diethyaluminum chloride used in Example 1 was replaced by one of the organoaluminum or organomagnesium compounds shown in Table 2.

Catalyst (d) Component

Catalyst (d) components were prepared by repeating the same procedure as for the (d) component of Example 1, except that the 2,6-di-t-butyl-4-methyl-phenoxylithium used in Example 1 was replaced by one of the alkali compounds shown in Table 2.

Preparation of Polymer Solution

The polymer (JSR SL 552) mentioned above was dissolved in cyclohexane to prepare a polymer solution containing 20% by weight of the polymer.

Hydrogenation of Polymer 5 kg of the polymer solution was charged into a dried 10-liter autoclave and maintained at 50° C. with stirring.

Separately, into the same pressure glass bottle as used in Example 1 were charged the above catalyst (a), (b) and (d) components at the ratio shown in Table 2, and the resulting mixture was aged in the same manner as in Example 1.

The reaction mixture of the (a), (b) and (d) components was added to the polymer solution in the autoclave, in an amount of 1 mM in terms of the (a) component.

Then, dried hydrogen gas was fed to the autoclave at a pressure of 10 kg/cm²G, and reaction was effected for 2 hours with stirring The degrees of hydrogenation of the hydrogenated polymers obtained are shown in Table 2.

TABLE 2

|  | Component (a) | Component (b) | | Component (d) | Ratio of catalyst components Component (a)/ Component (b)/ Component (d) | Degree of hydrogenation (%) |
|---|---|---|---|---|---|---|
|  |  | Organic alkali compound | Organoaluminum or organomagnesium compound |  |  |  |
| Example 4 | Bis(cyclopentadienyl)-titanium dichloride | sec-Butyllithium | Diethylaluminum chloride | Methoxylithium | 1/6.0/3.0 | 98 |
| Example 5 | Bis(cyclopentadienyl)-titaniumdimethyl | Phenoxylithium | Ethylaluminum sesquichloride | Phenoxylithium | 1/6.0/3.0 | 100 |
| Example 6 | Bis(cyclopentadienyl)- | Benzyloxylithium | Dimethylaluminum | 2,6-Di-t-butyl- | 1/3.0/3.0 | 99 |

TABLE 2-continued

| | | Component (b) | | | Ratio of catalyst components | Degree |
|---|---|---|---|---|---|---|
| | Component (a) | Organic alkali compound | Organoaluminum or organomagnesium compound | Component (d) | Component (a)/ Component (b)/ Component (d) | of hydrogenation (%) |
| | titaniumdibenzyl | | chloride | 4-phenoxylithium | | |
| Example 7 | Bis(cyclopentadienyl)-titanium dichloride | Ethoxysodium | Ethylaluminum dichloride | Phenoxylithium | 1/9.0/6.0 | 97 |
| Example 8 | Bis(cyclopentadienyl)-titaniumdi-p-tolyl | n-Butyllithium | Ethylmagnesium chloride | [2-(N,N-dimethylamino) ethoxy]lithium | 1/6.0/2.0 | 98 |
| Example 9 | Bis(cyclopentadienyl)-zirconium dichloride | n-Butyllithium | Ethylaluminum dichloride | Ethoxysodium | 1/4.0/2.0 | 97 |

Comparative Examples 1 and 2

Hydrogenation reactions were effected by repeating the same procedure as in Example 4, except that the complex compound used as the (b) component in Example 4 was replaced by one of the compounds shown in Table 3. The results obtained are shown in Table 3.

TABLE 3

| | Compound in place of compound (b) | Degree of hydrogenation (%) |
|---|---|---|
| Comparative Example 1 | Triethylaluminum | 0 |
| Comparative Example 2 | n-Butyllithium | 46 |

EXAMPLES 10–12 AND COMPARATIVE EXAMPLES 3 and 4

Polymer (Kraton D-1101) was dissolved in purified cyclohexane to prepare a polymer solution containing 10% by weight of the polymer Separately, the organic alkali compound and organoaluminum or organomagnesium compound shown in Table 4 were charged in this order into an autoclave at the proportions shown in Table 4, relative to the (a) component, to synthesize five complex compounds, each of which is the (b) component.

Subsequently, into the autoclave were charged 1.0 mM of the bis(cyclopentadienyl)transition metal compound shown as the (a) component in Table 4 dissolved in toluene and, the alkali compound shown as the (d) component in Table 4 in the amount shown in Table 4, in this order. Thereafter, dried hydrogen gas was fed at a pressure of 20 kg/cm²G. The resulting mixture was subjected to reaction for 30 minutes with stirring.

The degrees of hydrogenation of the hydrogenated polymers obtained are shown in Table 4.

TABLE 4

| | | Component (b) | | | Ratio of catalyst components Component (a)/ | Degree |
|---|---|---|---|---|---|---|
| | Component (a) | Organic alkali compound | Organoaluminum or organomagnesium compound | Component (d) | Component (b-1)/ Component (b-2)/ Component (d) | of hydrogenation (%) |
| Example 10 | Bis(cyclopentadienyl)-titaniumdimethyl | Phenoxylithium | Diethylaluminum chloride | Phenoxylithium | 1/4.0/4.0/2.0 | 98 |
| Example 11 | Bis(cyclopentadienyl)-titaniumdibenzyl | n-Butyllithium | Ethylauminum dichloride | Benzyloxylithium | 1/6.0/4.0/3.0 | 97 |
| Example 12 | Bis(cyclopentadienyl)-titanium dichloride | 2,6-Di-t-butyl-4-methyl-phenoxylithium | Dimethylmagnesium | Ethoxysodium | 1/6.0/6.0/1.0 | 97 |
| Comparative Example 3 | Bis(cyclopentadienyl)-titanium dichloride | Not used | Diethylaluminum chloride | Phenoxylithium | 1/0/9.0/3.0 | 48 |
| Comparative Example 4 | Bis(cyclopentadienyl)-titaniumdimethyl | n-Butyllithium | Not used | Phenoxylithium | 1/6.0/0/2.0 | 0 |

EXAMPLE 13

A cyclopentene polymer obtained by metathesis polymerization with tungsten tetrachloride and triethylaluminum was dissolved in purified toluene to prepare a polymer solution containing 10% by weight of the polymer 5 kg of the polymer solution was charged into a dried 10-liter autoclave and maintained at 70° C. with stirring Then, into the above autoclave were charged 10 mM of 2,6-di-t-butyl-4-methylphenoxylithium and 6 mM of diethylaluminum chloride, and the resulting mixture was subjected to reaction for 20 minutes Thereafter, 1 mM of bis(cyclopentadienyl)-titaniumdibenzyl dissolved in 10 ml of toluene was charged into the autoclave, after which hydrogen gas was fed at a pressure of 15 kg/cm2G and the mixture in the autoclave was subjected to reaction for 1 hour with stirring.

The results obtained are shown in Table 5.

EXAMPLE 14

Polymer hydrogenation was effected by repeating the same procedure as in Example 13, except that the cyclopentene polymer used in Example 13 was replaced by a cyclooctene polymer obtained by metathesis polymerization with tungsten tetrachloride and triethylaluminum.

The results obtained are shown in Table 5.

TABLE 5

| | Polymer | Degree of hydrogenation (%) |
|---|---|---|
| Example 13 | Cyclopentene polymer | 99 |
| Example 14 | Cyclooctene polymer | 98 |

EXAMPLE 15

Into a 10-liter autoclave were charged 5 kg of degasified and dehydrated cyclohexane, 300 g of styrene and 700 g of 1,3-butadiene. Thereto were added 5 g of tetrahydrofuran and 0.7 g of n-butyllithium. The resulting mixture was subjected to polymerization. When the conversion reached about 100%, 1.6 g of 2,6-di-t-butyl-p-cresol was charged into the autoclave, and the resulting mixture was stirred for 10 minutes to synthesize 2,6-di-t-butyl-4-methylphenoxylithium.

Subsequently, 1 g of diethylaluminum chloride was charged into the autoclave to form a lithium-aluminum complex compound as the (b) component. Thereafter, into the autoclave were charged 0.3 g of bis(cyclopentadienyl)titanium dichloride dissolved in 100 ml of toluene and 0.4 g of phenoxylithium dissolved in 10 ml of cyclohexane, in this order.

Then, hydrogen was fed to the autoclave at a pressure of 10 kg/cm2G, and the mixture in the autoclave was subjected to reaction for 20 minutes. The reaction temperature was then lowered from 70° C. to 40° C., and the reaction was continued for a further 20 minutes.

The hydrogenated polymer obtained had a degree of hydrogenation of 100%.

EXAMPLE 16

Into a 10-liter autoclave were charged 5 kg of purified and dehydrated cyclohexane, 300 g of styrene and 700 g of 1,3-butadiene. Thereto were added 5 g of tetrahydrofuran and 0.7 g of n-butyllithium. The resulting mixture was subjected to temperature-elevating polymerization starting from 30° C.

When the conversion reached about 100%, 2.6 g of 4,4'-diphenylmethane diisocyanate was added to modify the terminals of the formed polymer with the isocyanate.

At that time, partial coupling occurred and the proportion of the coupled polymer to the uncoupled polymer was 50/50.

The temperature of the reaction mixture was adjusted to 40° C. Thereto were added 0.8 g of n-butyllithium and 1.5 g of 2,6-di-t-butyl-p-cresol to synthesize 2,6-di-t-butyl-4-methylphenoxylithium. 2 g of diethylaluminum chloride was further added to react with the 2,6-di-t-butyl-4-methylphenoxylithium to form a lithium-aluminum complex compound as the (b) component. Then, 0.5 g of bis(cyclopentadienyl) titanium dichloride was added, and the resulting mixture was subjected to hydrogenation reaction with hydrogen of 10 kg/cm$^2$G for 30 minutes.

As a result, there was obtained a polymer having a degree of hydrogenation of 98%.

EXAMPLES 17-19

Catalyst (c) Component

Purified and dried tetrahydrofuran was used as the (c) component, i.e. the polar component.

Hydrogenation of Polymer 5 kg of each of the polymer solutions used in Examples 1-3 was charged into a dried 10-liter autoclave and maintained at 70° C. with stirring.

Separately, into a 100-ml pressure glass bottle purged with nitrogen were charged 1.0 mM of the same catalyst (a) component as used in Example 1, 6.0 mM of the same (b) component as used in Example 1, 20 ml of cyclohexane, 12.0 mM of the above-mentioned (c) component and 3.0 mM of the same (d) component as used in Example 1. They were mixed and allowed to stand for hour. The resulting mixture was added to the polymer solution in the 10-liter autoclave. Dried hydrogen gas was fed to the autoclave at a pressure of 5 kg/cm$^2$G, and the resulting mixture was subjected to reaction for 1 hour with stirring.

The autoclave inside was returned to room temperature and atmospheric pressure. The reaction mixture was withdrawn from the autoclave and poured into water with stirring. The solvent was removed by steam distillation to obtain a white hydrogenated polymer.

The hydrogenated polymer was measured for degree of hydrogenation using the infrared absorption spectrum. The results are shown in Table 6.

TABLE 6

| | Kind of polymer | Component (C) | Time of standing (hr) | Degree of hydrogenation (%) |
|---|---|---|---|---|
| Example 17 | A | Tetrahydrofuran | 1 | 98 |
| Example 18 | B | Tetrahydrofuran | 1 | 99 |
| Example 19 | C | Tetrahydrofuran | 1 | 99 |

EXAMPLE 20

The polymer A (JSR SL 552) was dissolved in purified and dried cyclohexane to prepare a polymer solution containing 20% by weight of the polymer. 5 kg of the polymer solution was charged into a dried 10-liter autoclave and maintained at 70° C. with stirring.

Separately, into a 100-ml pressure glass bottle purged with nitrogen were charged 1.0 mM of the same catalyst (a) component as used in Example 1, 6.0 mM of the same (b) component as used in Example 1, 20 ml of cyclohexane and 12.0 mM of the same (c) component as used in Example 17. They were mixed and allowed to stand for 1 hour. The resulting mixture was added to the polymer solution in the 10-liter autoclave. Dried hydrogen gas was fed to the autoclave at a pressure of 5 kg/cm$^2$G. The mixture was subjected to reaction for 1 hour with stirring. The hydrogenated polymer obtained had a degree of hydrogenation of 99%.

EXAMPLES 21-22

Into a 10-liter autoclave were charged 5 kg of purified and dried cyclohexane, 300 g of styrene and 700 g of 1,3 butadiene. Thereto were added 5 g of tetrahydrofuran and 0.7 g of n-butyllithium. The resulting mixture was subjected to temperature-elevating polymerization starting from 30° C.

When the conversion reached about 100%, the reaction mixture was maintained at 40° C. with stirring.

Separately, into a vessel purged with nitrogen were charged 1.0 mM of the same catalyst (a) component as used in Example 1, 6.0 mM of the same (b) component as used in Example 1, 20 ml of cyclohexane, 12.0 mM of the same (c) component as used in Example 17 and 3.0 mM of the same (d) component as used in Example 1. They were mixed and divided into two portions. Each portion was allowed to stand for a given period of time as shown in Table 7, after which it was charged into the above 10-liter autoclave. Dried hydrogen gas was fed to the autoclave at a pressure of 10 kg/cm$^2$G, and the mixture was subjected to reaction for 1 hour with stirring.

The results obtained are shown in Table 7.

EXAMPLES 23-24

Polymerization was effected in the same manner as in Example 21. The reaction mixture was maintained at 40° C.

Separately, into a vessel purged with nitrogen were charged 1.0 mM of the same catalyst (a) component as used in Example 1, 6.0 mM of the same (b) component as used in Example 1, 20 ml of cyclohexane and 12.0 mM of the same (c) component as used in Example 17. They were mixed and divided into two portions. Each portion was allowed to stand for a given period of time as shown in Table 7, after which it was charged into the autoclave in which the above polymerization had been effected Dried hydrogen gas was fed to the autoclave at a pressure of 10 kg/cm$^2$G. The mixture in the autoclave was subjected to reaction for 1 hour with stirring. The degrees of hydrogenation of the hydrogenated polymers obtained are shown in Table 7.

TABLE 7

| | Component (C) | Time of standing (hr) | Degree of hydrogenation (%) |
|---|---|---|---|
| Example 21 | Tetrahydrofuran | 48 | 99 |
| Example 22 | Tetrahydrofuran | 720 | 98 |
| Example 23 | Tetrahydrofuran | 48 | 98 |
| Example 24 | Tetrahydrofuran | 720 | 99 |

EXAMPLES 25-30

Catalyst (a) Component

Each of the bis(cyclopentadienyl)transition metal compounds shown in Table 8 was used as the catalyst (a) component.

Preparation of Catalyst (b) Component

Catalyst (b) components were prepared by repeating the same procedure as in the case of the (b) component in Example 1, except that the n-butyllithium used in Example 1 was replaced by the organic alkali compounds shown in Table 8 and the diethylaluminum chloride used in Example 1 was replaced by the organoaluminum and organomagnesium compounds shown in Table 8.

Catalyst (c) Component

Each of the polar compounds shown in Table 8 was used as the catalyst (c) component.

Catalyst (d) Components

Each of the alkali compounds shown in Table 8 was used as the catalyst (d) component.

Preparation of Polymer Solution

The above-mentioned JSR SL 552 polymer was dissolved in cyclohexane to prepare a polymer solution 10 containing 20% by weight of the polymer.

Hydrogenation of Polymer 5 kg of the above polymer solution was charged into a 10-liter autoclave and maintained at 50° C. with stirring.

The above (a), (b), (c) and (d) catalyst components were mixed in the ratios shown in Table 8, and the resulting mixtures were allowed to stand. Then, each of the reaction mixtures of the (a), (b), (c) and (d) components was added to the polymer solution in the autoclave, in an amount of 1 mM in terms of the (a) component.

Thereafter, dried hydrogen gas was charged into the autoclave at a pressure of 10 kg/cm2G. The mixture in the autoclave was subjected to reaction for 2 hours with stirring. The degrees of hydrogenation of the hydrogenated polymers obtained are shown in Table 8.

TABLE 8

| | Component (a) | Component (b) Organic alkali compound | Component (b) Organoaluminum or organomagnesium compound | Component (c) and time of standing (hr) | Component (d) | Ratio of catalyst components Component (a)/ Component (b)/ Component (c)/ Component (d) | Degree of hydrogenation (%) |
|---|---|---|---|---|---|---|---|
| Example 25 | Bis(cyclopentadienyl)-titanium dichloride | sec-Butyllithium | Diethylaluminum chloride | Tetrahydrofuran 48 | Methoxylithium | 1/6.0/12.0/3.0 | 99 |
| Example 26 | Bis(cyclopentadienyl)-titaniumdimethyl | Phenoxylithium | Ethylaluminum sesquichloride | Tetrahydrofuran 48 | Phenoxylithium | 1/6.0/12.0/3.0 | 100 |
| Example 27 | Bis(cyclopentadienyl)-titaniumdibenzyl | Benzyloxylithium | Dimethylaluminum chloride | Tetrahydrofuran 120 | 2,6-Di(t-butyl)-4-methyl-phenoxylithium | 1/3.0/6.0/3.0 | 99 |
| Example 28 | Bis(cyclopentadienyl)-titanium dichloride | Ethoxysodium | Ethylaluminum dichloride | Tetrahydrofuran 120 | Phenoxysodium | 1/9.0/18.0/3.0 | 99 |
| Example 29 | Bis(cyclopentadienyl)-titaniumdi(p-tolyl) | n-Butyllithium | Ethylmagnesium chloride | 1,4-Dioxane 72 | [2-(N,N-dimethylamino)-ethoxy]lithium | 1/6.0/12.0/2.0 | 98 |
| Example 30 | Bis(cyclopentadienyl)-zirconium dichloride | n-Butyllithium | Ethylaluminum dichloride | Diethyl ether 72 | Ethoxysodium | 1/4.0/8.0/2.0 | 100 |

EXAMPLE 31

Into a 10-liter autoclave were charged 5 kg of purified and dried cyclohexane, 300 g of styrene and 700 g of 1,3-butadiene. Then, 5 g of tetrahydrofuran and 0.7 g of n-butyllithium were charged thereinto. The resulting mixture was subjected to temperature-elevating polymerization starting from 30° C.

When the conversion reached about 100%, 2.6 g of 4,4'-diphenylmethane diisocyanate was added to modify the terminals of the polymer obtained with the isocyanate. At this time, partial coupling occurred and the ratio of the coupled polymer to the uncoupled polymer was about 50/50. The polymer solution was maintained at 40° C. with stirring.

Separately, into a vessel purged with nitrogen were charged the same catalyst (a), (b), (c) and (d) components as used in Example 17 in the same ratio as in Example 17. They were mixed and allowed to stand for 72 hours, after which the mixture was added to the polymer solution in the autoclave.

Then, dried hydrogen gas was fed to the autoclave at a pressure of 10 kg/cm$^2$G. The mixture in the autoclave was subjected to reaction for 3 hours with stirring.

The degree of hydrogenation of the hydrogenated polymer obtained was 98%.

The hydrogenated polymer obtained by this invention can be used as a thermoplastic elastomer or thermoplastic resin having excellent weather resistance, heat resistance and acid resistance, and can also be used after being mixed with additives such as ultraviolet absorber, oil, primer and the like or with other elastomers or resins. Thus, the hydrogenated polymer is useful in industry.

The catalyst composition used in this invention maintains substantially the same hydrogenation activity as that just after its preparation, for along time, and can hydrogenate olefinically unsaturated polymers selectively at a very high rate at a high conversion under mild conditions.

What is claimed is:

1. A process for hydrogenating an olefinically unsaturated polymer which comprises contacting the olefinically unsaturated polymer with hydrogen in the presence of a hydrogenation catalyst composition comprising:

(a) at least one bis(cyclopentadienyl)-transition metal compound represented by formula (i):

wherein $M^1$ is at least one transition metal atom selected from the group consisting of titanium, zirconium and hafnium; and $R^1$ and $R^2$, which may be the same or different, represent alkyl groups, aryl groups, aralkyl groups, alkoxy groups, aryloxy groups, carboxyl groups, carbonyl groups, β-diketone ligands or halogen atoms and (b) at least one member selected from the group consisting of complex compounds represented by formulas (ii) and (iii):

$$M^2(AlR^3R^4R^5R^6) \quad \text{(ii)}$$

$$M^2(MgR^3R^4R^6) \quad \text{(iii)}$$

wherein $M^2$ is at least one alkali metal atom selected from the group consisting of lithium, sodium and potassium; $R^3$ is an alkyl group, an aryl group or an aralkyl group; $R^4$ is an alkyl group, an aryl group, an aralkyl group or a halogen atom; $R^5$ is a halogen atom; and $R^6$ is an alkyl group, an aryl group, an aralkyl group, an alkoxy group or an aryloxy group to selectively hydrogenate the olefinic double bonds of the polymer.

2. A process for hydrogenating an olefinically unsaturated polymer which comprises contacting the olefinically unsaturated polymer with hydrogen in the presence of a hydrogenation catalyst composition comprising:

(a) at least one bis(cyclopentadienyl)-transition metal compound represented by formula (i):

wherein $M^1$ is at least one transition metal atom selected from the group consisting of titanium, zirconium and hafnium; and $R^1$ and $R^2$, which may be the same or different, represent alkyl groups, aryl groups, aralkyl groups, alkoxy groups, aryloxy groups, carboxyl groups, carbonyl groups, β-diketone ligands or halogen atoms;

(b) at least one member selected from the group consisting of complex compounds represented by formulas (ii) and (iii):

$$M^2(AlR^3R^4R^5R^6) \quad \text{(ii)}$$

$$M^2(MgR^3R^4R^6) \quad \text{(iii)}$$

wherein $M^2$ is at least one alkali metal atom selected from the group consisting of lithium, sodium and potassium; $R^3$ is an alkyl group, an aryl group or an aralkyl group; $R^4$ is an alkyl group, an aryl group, an aralkyl group or a halogen atom; $R^5$ is a halogen atom; and $R^6$ is an alkyl group, an aryl group, an aralkyl group, an alkoxy group or an aryloxy group; and (c) at least one polar compound selected from the group consisting of ether compounds, thioether compounds, ketone compounds, sulfoxide compounds, carboxylic acid ester compounds, lactone compounds, amine compounds, amide compounds, nitrile compounds and oxime compounds to selectively hydrogenate the olefinic double bonds of the polymer.

3. A process for hydrogenating an olefinically unsaturated polymer which comprises contacting the olefinically unsaturated polymer with hydrogen in the presence of a hydrogenation catalyst composition comprising:

(a) at least one bis(cyclopentadienyl)-transition metal compound represented by formula (i):

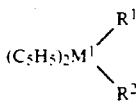

wherein $M^1$ is at least one transition metal atom selected from the group consisting of titanium, zirconium and hafnium; and $R^1$ and $R^2$, which may be the same or different, represent alkyl groups, aryl groups, aralkyl groups, alkoxy groups, aryloxy groups, carboxyl groups, carbonyl groups, $\beta$-diketone ligands or halogen atoms;

(b) at least one member selected from the group consisting of complex compounds represented by general formulas (ii) and (iii):

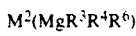

wherein $M^2$ is at least one alkali metal atom selected from the group consisting of lithium, sodium and potassium, $R^3$ is an alkyl group, an aryl group or an aralkyl group; $R^4$ is an alkyl group, an aryl group, an aralkyl group or a halogen atom; $R^5$ is a halogen atom; and $R^6$ is an alkyl group, an aryl group, an aralkyl group, an alkoxy group or an aryloxy group;

(c) at least one polar compound selected from the group consisting of ether compounds, thioether compounds, amide compounds, lactone compounds, amine compounds, amide compounds, nitrile compounds and oxime compounds; and (d) an alkali compound represented by formula (iv):

wherein $M^2$ is as defined above and $R^7$ is an alkyl group, an aryl group, an aralkyl group, or a hydrocarbon group having an oxygen atom or a nitrogen atom, or both, to selectively hydrogenate the olefinic double bonds of the polymer.

4. A process for hydrogenating an olefinically unsaturated polymer which comprises contacting the olefinically unsaturated polymer with hydrogen in the presence of a hydrogenation catalyst composition comprising:

(a) at least one bis(cyclopentadienyl)-transition metal compound represented by formula (i):

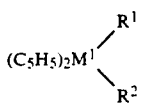

wherein $M^1$ is at least one transition metal atom selected from the group consisting of titanium, zirconium and hafnium; and $R^1$ and $R^2$, which may be the same or different, represent alkyl groups, aryl groups, aralkyl groups, alkoxy groups, aryloxy groups, carboxyl groups, carbonyl groups, $\beta$-diketone ligands or halogen atoms;

(b) at least one member selected from the group consisting of complex compounds represented by formulas (ii) and (iii):

wherein $M^2$ is at least one alkali metal atom selected from the group consisting of lithium, sodium and potassium; $R^3$ is an alkyl group, an aryl group or an aralkyl group; $R^4$ is an alkyl group, an aryl group, an aralkyl group or a halogen atom; $R^5$ is a halogen atom; and $R^6$ is an alkyl group, an aryl group, an aralkyl group, an alkoxy group or an aryloxy group; and (d) an alkali compound represented by formula (iv):

wherein $M^2$ is as defined above; and $R^7$ is an alkyl group, an aryl group, an aralkyl group, or a hydrocarbon group having an oxygen atom or a nitrogen atom, or both, to selectively hydrogenate the olefinic double bonds of the polymer.

5. The process according to claim 1 or 2, wherein the olefinically unsaturated polymer is a conjugated diene polymer or a random, block or graft copolymer of a conjugated diene and a monomer copolymerizable therewith.

6. The process according to claim 1 or 2, wherein the conjugated diene polymer is a conjugated diene homopolymer, a copolymer of different conjugated dienes or a copolymer of at least one conjugated diene with at least one monomer copolymerizable therewith.

7. The process according to claim 3 or 4, wherein the olefinically unsaturated polymer is a conjugated diene polymer or a random, block or graft copolymer of a conjugated diene and a monomer copolymerizable therewith.

8. The process according to claim 3 or 4, wherein the conjugated diene polymer is a conjugated diene homopolymer, a copolymer of different conjugated dienes or a copolymer of at least one conjugated diene with at least one monomer copolymerizable therewith.

9. The process according to claim 5 or 6, wherein the conjugated diene is 1,3-butadiene or isoprene.

10. The process according to claim 7 or 8, wherein the conjugated diene is 1,3-butadiene or isoprene.

* * * * *